2,723,260

COPOLYMERS OF VINYL CHLORIDE AND CYANO ETHER-ESTERS

David T. Mowry and Richard R. Morner, Dayton, Ohio, assignors to Monsanto Chemical Company, St. Louis, Mo., a corporation of Delaware No Drawing. Application December 17, 1951, Serial No. 262,159

4 Claims. (Cl. 260—85.5)

This invention relates to new copolymers which are capable of fabrication into desirable transparent flexible films. More particularly the invention relates to copolymers of vinyl chloride and certain cyano ether-esters.

Numerous copolymers of vinyl chloride are known, but generally such copolymers do not have sufficient toughness and flexibility to be useful as films unless large quantities of plasticizers are included.

The primary purpose of this invention is to prepare novel synthetic elastomeric compositions having an unusual combination of high strength, flexibility and toughness. A further purpose of this invention is to provide useful copolymers of vinyl chloride which do not require plasticizers to develop the desirable properties.

It has been found that vinyl chloride and certain cyano ether-esters give very desirable compositions when copolymerized in suitable proportions. The preferred proportions employed for producing the new copolymers may consist generally of from 1% to 50% of the cyano ether-ester, although the more valuable products are prepared utilizing from 10% to 50% by weight of the ester in the copolymer.

The cyano esters useful for the preparation of the present copolymers are acrylates or methacrylates having the formula

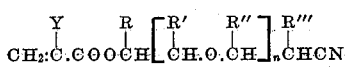

in which Y, R, R', R" and R'" are selected from the class consisting of hydrogen and the methyl radical and $n$ is an integer of from 1 to 3.

Compounds having the above formula form the subject of the copending application Serial No. 262,157 of David T. Mowry and Eugene L. Ringwald, filed of even date herewith and now Patent No. 2,669,558. They are obtainable by contacting, in the presence of an esterifying agent, acrylic acid or methacrylic acid or an acid halide thereof such as acrylyl chloride or methacrylyl bromide with a hydroxy alkoxy nitrile having the formula

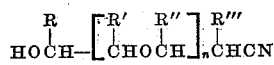

in which R, R', R" and R'" is as defined above. Hydroxy alkoxy nitriles having this formula are easily obtainable by the addition of acrylonitrile or methacrylonitrile to alkylene glycols or to polyalkylene glycols having the formula

in which $x$ is 0, 1 or 2. As examples of useful hydroxyalkoxynitriles may be mentioned the 2-(2-hydroxyethoxy)propionitrile obtainable from ethylene glycol and acrylonitrile; the 2-(2-hydroxyethoxy)-1-methylpropionitrile obtainable from ethylene glycol and methacrylonitrile; the 2-(2-hydroxypropoxy)propionitrile obtainable from propylene-1,2-glycol and acrylonitrile; the 2-(2-hydroxy-1-methylpropoxy)propionitrile obtainable from 2,3-butylene glycol and acrylonitrile; the 2-[2-(2-hydroxyethoxy)ethoxy]-propionitrile obtainable by reaction of diethylene glycol and acrylonitrile; and the hydroxy polyalkoxyalkylene nitriles obtainable by reaction of such polyglycols as triethylene glycol or tripropylene glycol with acrylonitrile or methacrylonitrile.

Examples of cyano ether-esters which may be copolymerized with vinyl chloride to yield the present synthetic elastomers are 2-(2-cyanoethoxy)ethyl acrylate or methacrylate which is obtainable from acrylic acid or methacrylic acid and 2-(2-hydroxyethoxy)propionitrile, 2-(2-cyanopropoxy)ethyl acrylate or methacrylate which is obtainable from acrylic acid or methacrylic acid and 2-(2 - hydroxyethyl) - 1 - methylpropionitrile, 2-[2-(2-cyanoethoxy)ethoxy]ethyl acrylate or methacrylate which is obtainable from acrylic acid or methacrylic acid and 2-[2-(2-hydroxyethoxy)ethoxy]propionitrile, 2-(2-cyanoethoxy)-1-methylethyl acrylate or methacrylate which is obtainable from acrylic or methacrylic acid and 2-(2-hydroxypropoxy)propionitrile, etc.

The new copolymers may be prepared by any of the several polymerization methods known to the art, but the emulsion polymerization method is the most effective. In the practice of the emulsion polymerization technique monomers are contacted in the presence of water which contains dissolved therein a suitable peroxy catalyst and preferably an emulsion stabilizing agent. If desired all of the monomers may be charged to the polymerization reactor at the beginning of the reaction, or they may be added periodically or gradually throughout the course of the reaction. Similarly, the catalyst and emulsifying agent may also be introduced either at the start or in increments during the reaction. The preferred method of conducting the polymerization involves the mixing of the monomers in the desired proportions and adding the mixture gradually to a reaction vessel maintained under the desired conditions for polymerization.

The emulsion polymerizations are catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compounds containing a peroxy radical. The quantity of peroxy compound may be from 0.05 to 2.0 per cent by weight of the polymerizable compound. The catalyst may be charged at the beginning of the reaction or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation, it is generally desirable to promote the uniform distribution of reagents by using wetting agents, or emulsion stabilizers. Suitable agents for this purpose are the water soluble salts of fatty acids, such as sodium oleate, and potassium stearate; mixtures of water soluble fatty acid salts, such as the common soaps prepared by the saponification of animal and vegetable oils, the "amino soaps," such as triethanolamine and dodecyl methyl amine, salts of rosin acids and mixtures thereof, the water soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.1 to 5 per cent by weight of the monomer may be employed.

The emulsion polymerization reactions are conducted at temperatures between 30° and 70° C., but preferably at the reflux temperature of the emulsion. The polymerization temperatures should be maintained substantially constant, and by operation at reflux temperatures the rate of addition of the monomers may be regulated so as to maintain the temperature more nearly constant. Under such conditions the optimum quantity of the product is obtained.

The reaction is preferably initiated by charging the reactor with water containing the catalyst and emulsifier in solution, and thereafter adding the monomer gradually at rates which enable the maintenance of a constant temperature. If desired the monomers may each be added in a separate stream of premixed monomer. In order to avoid unduly high concentrations of emulsifier in the reaction mass at the beginning of the reaction most of it may be mixed with the monomer and added therewith during the reaction. Preferably, only a small proportion of the catalyst is charged at the beginning of the reaction and the remainder is added either continuously or intermittently throughout the course of the reaction. The preferred manner of operation involves heating the water containing a small amount of catalyst and emulsifier to approximately the ultimate polymerization temperature and initiating the reaction by introducing the stream of mixed monomers.

The emulsion polymerizations are conducted in metal, glass or glass-lined vessels, which are provided with means for agitating the contents thereof. Generally, rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

The new copolymers are of particular utility in the fabrication of flexible films suitable for various wrapping applications, especially food products because of the absence of deleterious volatile plasticizers. The copolymers are also suited to compression molding methods by reasons of their toughness and tensile strength.

Further details of the practice of this invention are set forth with respect to the following specific examples.

*Example 1*

An autoclave provided with a stirring mechanism was charged with a mixture of 440 g. of distilled water, 1.6 g. of sodium bisulfite and 1.0 g. of an alkyl sulfate emulsifier known to the trade as Duponol ME and reported on page 4 of the August 1945, issue of "Soap and Sanitary Chemicals," to be technical sodium lauryl sulfate. The reactor and its contents was heated to approximately 40° C., swept out with nitrogen for about 30 minutes and then a monomer mixture consisting of equal parts by weight of vinyl chloride and 2-(2-cyanoethoxy)ethyl acrylate was added to the reactor at such a rate which permitted the maintenance of the temperature at about 40° C. Simultaneously a catalyst mixture consisting of 0.5 g. of potassium persulfate and 0.5 g. of sodium bicarbonate dissolved in 80 cc. of water was added. Addition of monomer and catalyst was stopped after about 3.5 hours during which time a total of about 200 g. of monomer mixture, 0.25 g. of sodium bicarbonate, 0.25 g. of potassium persulfate and 41 g. of water had been added. The weight of the emulsion thus obtained was 648.2 g. A portion (155 g.), of this emulsion was poured into about 2 liters of alcohol with stirring and warmed to about 50° C. Filtration of the product and drying of the precipitate gave 38.8 g. of a white powdery copolymer. Analysis of the copolymer showed 29.51 per cent chlorine and 3.78 per cent nitrogen corresponding to a copolymer of about 52 per cent vinyl chloride and about 48 per cent 2-(2-cyanoethoxy)ethyl acrylate. Compression molded test specimens of the copolymer were found to possess a tensile strength of 1440 p. s. i., an elongation of 180 per cent and a flex temperature of 16° C.

*Example 2*

In this example the properties of a vinyl chloride-2-(2-cyanoethoxy)ethyl acrylate copolymer are compared to a similarly prepared vinyl chloride 2-(2-methoxyethoxy)-ethyl acrylate copolymer. Emulsion systems consisting of the following were tumbled at 40° C. for 19 hours:

0.04 g. sodium bicarbonate
0.5 g. alkyl sulfate emulsifier (that of Example 1)
0.5 g. potassium persulfate
0.2 g. sodium bisulfite
400 g. water
50 g. vinyl chloride
50 g. of either the cyanoethoxy ester or the methoxyethoxy ester.

At the end of this time each of the resulting emulsions were worked up by coagulating in a blendor with 0.6 per cent aluminum sulfate solution, bringing the whole to a pH of 8–9 by treatment with aqueous sodium hydroxide, filtering and drying. The copolymer prepared from the cyano ester analyzed 3.76% N and 28.8% Cl, corresponding to about 49% of cyano ester and about 51% of vinyl chloride. Chlorine analysis of the copolymer from the methoxyethoxy ester (28.49% Cl) indicated a copolymer having a 50.2 per cent vinyl chloride content. Compression molded test specimens were prepared from each of the two copolymers. The cyano ester copolymer was found to have a tensile strength of 2240 p. s. i. and the following Clash-Berg values.

$T_f$ _____ minus 1.0° C.
$T_{2000}$ _____ 69° C.
Modulus/25° C. _____ 11,000

The methoxyethoxy copolymer was found to have a tensile strength of 1450 p. s. i. and the following Clash-Berg values:

$T_f$ _____ minus 2.5° C.
$T_{2000}$ _____ 30.5° C.
Modulus/25° C. _____ 3,000

Portions of each of the two copolymers were stabilized by milling with 3 per cent of cadmium acetate and compression molded into test specimens. The following test data was obtained:

| | Cyanoethoxy Copolymer | Methoxyethoxy Copolymer |
| --- | --- | --- |
| Tensile strength | 2,500 p. s. i. | 1,650 p. s. i. |
| Shore Hardness | 99 | 84. |
| $T_f$ | minus 2.5° C. | minus 2.0° C. |
| $T_{2000}$ | 74° C. | 39° C. |
| SR | 76.5° C. | 41° C. |
| Modulus/25° C. | 29,000 | 4,900. |

*Example 3*

Operating as in Example 2 the following emulsion system was tumbled for 21 hours at a temperature of 40° C.

75 g. distilled water
0.02 g. sodium bicarbonate
0.15 g. alkyl sulfate emulsifier (that of Example 1)
0.16 g. sodium bisulfite
0.04 g. potassium persulfate
15 g. 2-(2-cyanoethoxy)ethyl acrylate
35 g. vinyl chloride Precipitation of the resulting emulsion by pouring it into alcohol and filtration and drying of the product gave 43.8 g. (87.6 per cent) yield of a copolymer analyzing 39.5% Cl and 2.8% N, which corresponded to a copolymer of about 70% vinyl chloride and about 30% of the acrylate. The copolymer was readily compression molded to give products having very good mechanical strength and improved heat resistant properties.

Although the invention has been described with respect to specific embodiments, it is not intended that the details thereof shall be construed as limitations upon the scope of the invention except to the extent incorporated in the following claims.

What we claim is:

1. The copolymer of vinyl chloride and a cyano ether-ester having the formula

in which R, R', R" and R''' are selected from the class consisting of hydrogen and the methyl radical and $n$ is an integer of from 1 to 3, said copolymer containing from 1% to 50% by weight of said ester, with the balance being vinyl chloride.

2. The copolymer of vinyl chloride and 2-(2-cyanoethoxy)ethyl acrylate, said copolymer containing from 1% to 50% by weight of said acrylate, with the balance being vinyl chloride.

3. The process for producing a resinous product which comprises heating, in the presence of a peroxidic polymerization catalyst, a mixture of vinyl chloride and a cyano ether-ester having a formula

in which R, R', R" and R''' are selected from the class consisting of hydrogen and the methyl radical and $n$ is an integer of from 1 to 3, said mixture containing from 1% to 50% by weight of said ester with the balance being vinyl chloride.

4. The process for producing a resinous product which comprises heating, in the presence of a peroxidic polymerization catalyst, a mixture of vinyl chloride and 2-(2-cyanoethoxy)ethyl acrylate, said mixture containing from 1% to 50% by weight of said acrylate, with the balance being vinyl chloride.

References Cited in the file of this patent

UNITED STATES PATENTS

| | | |
|---|---|---|
| 2,129,694 | Izard | Sept. 13, 1938 |
| 2,379,297 | Harmon et al. | June 26, 1945 |